(12) United States Patent
Weng et al.

(10) Patent No.: US 7,131,641 B2
(45) Date of Patent: Nov. 7, 2006

(54) PRESSING DEVICE FOR LITHIUM BATTERIES

(75) Inventors: Shih-Hsiung Weng, Taipei (TW); Kok-Aun Ong, Penang (MY)

(73) Assignee: Inventec Multimedia & Telecom Corporation, Taipei (TW)

( * ) Notice: Subject to any disclaimer, the term of this patent is extended or adjusted under 35 U.S.C. 154(b) by 184 days.

(21) Appl. No.: 11/033,559

(22) Filed: Jan. 12, 2005

(65) Prior Publication Data

US 2006/0066017 A1    Mar. 30, 2006

(30) Foreign Application Priority Data

Sep. 24, 2004   (TW) ............................... 93215323 U

(51) Int. Cl.
*H01M 2/10* (2006.01)
(52) U.S. Cl. ...................................... 267/160; 429/100
(58) Field of Classification Search .............. 267/158, 267/160; 429/53–160
See application file for complete search history.

(56) References Cited

U.S. PATENT DOCUMENTS

| | | | | |
|---|---|---|---|---|
| 4,070,821 A | * | 1/1978 | Somogyi | 368/300 |
| 5,169,733 A | * | 12/1992 | Savovic et al. | 429/157 |
| 5,631,098 A | * | 5/1997 | Suzuki | 429/1 |
| 5,766,791 A | * | 6/1998 | Takahashi et al. | 429/57 |
| 6,017,128 A | * | 1/2000 | Goldston et al. | 362/103 |
| 6,790,545 B1 | * | 9/2004 | Wu | 429/1 |

* cited by examiner

*Primary Examiner*—Christopher P. Schwartz

(74) *Attorney, Agent, or Firm*—Rabin & Berdo, P.C.

(57) ABSTRACT

A pressing device for pressing lithium batteries with different thickness is installed on an electronic device to pressing a first lithium battery and a second lithium battery with different thickness using a first pressing part and a second pressing part with different curvatures. The first lithium battery and the second lithium battery are thus fixed in their positions without using additional tools.

3 Claims, 5 Drawing Sheets

PRESSING DEVICE FOR LITHIUM BATTERIES

BACKGROUND OF THE INVENTION

1. Field of Invention

The invention relates to a pressing device for pressing lithium batteries in an electronic device and, in particular, to a pressing device for pressing lithium batteries with different thickness.

2. Related Art

In general, providing power for an electronic device to operate is a very common technique. Such power can be provided in a wired way or a wireless way. The most commonly seen wireless way of providing power is using batteries. There are many types of batteries, and the lithium battery is the most popular one. When an electronic device uses lithium batteries, a pressing device is often used to press the lithium batteries in the electronic device. However, when one replaces the lithium batteries with thinner ones, the original pressing device may not be able to function properly. Therefore, additional devices have to be used in order to press the new thinner lithium batteries. This will increase the cost.

SUMMARY OF THE INVENTION

In view of the foregoing, an objective of the invention is to provide a pressing device for pressing lithium batteries with different thickness. A first pressing part and a second pressing part are used to impose forces on a first lithium battery and a second lithium battery in the electronic device, fixing them in their positions.

To achieve the above objective, the disclosed pressing device includes a body, a first pressing part, and a second pressing part.

The body has openings corresponding to pins on the electronic device for its installation. The first pressing part protrudes from the body to press the first lithium battery with a first thickness. The second pressing part also protrudes from the body, with a slightly larger curvature from the first pressing part, to press the second lithium battery with a second thickness. The first thickness and the second thickness are different. The width of the first pressing part is smaller than that of the second pressing part.

During the assembly, one simply aligns the openings with the pins and then fixes the invention on an electronic device with an adhesive agent.

Since the curvature of the first pressing part is smaller than that of the second pressing part, therefore, when the first lithium battery is placed inside the electronic device it is pressed by the first pressing part in its position. When the second lithium battery is placed inside the electronic device, it is pressed by both the first and second pressing parts, fixing it in its position.

Since the invention uses the first pressing part and the second pressing part to provide pressing forces on the first and second lithium batteries in the electronic device, fixing them in their positions, there is no need to use additional tools to pressing the batteries with different thickness.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1A:
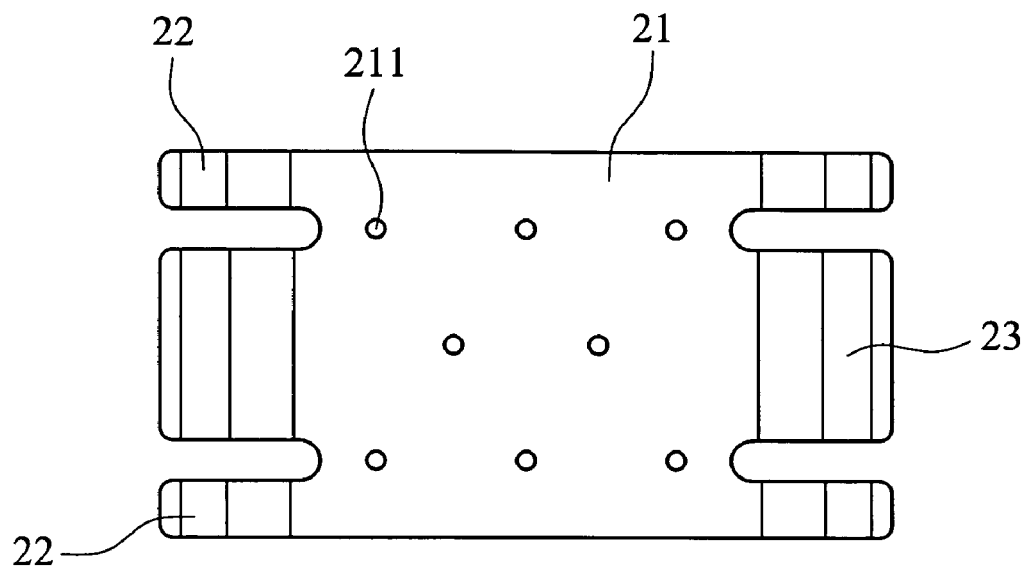
FIGS. 1A and 1B are front and side views of the invention.
Figure 1B:
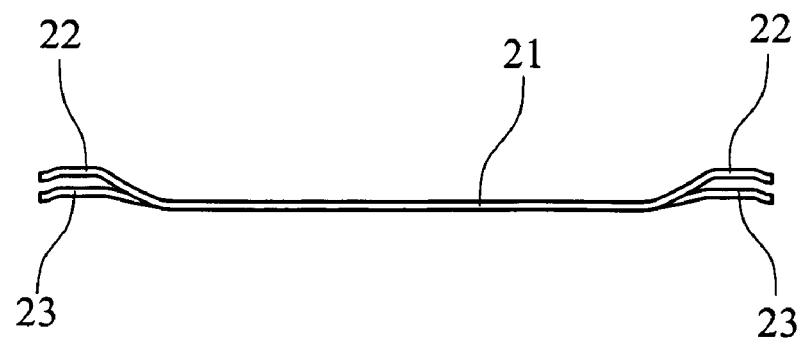
Figure 2A:
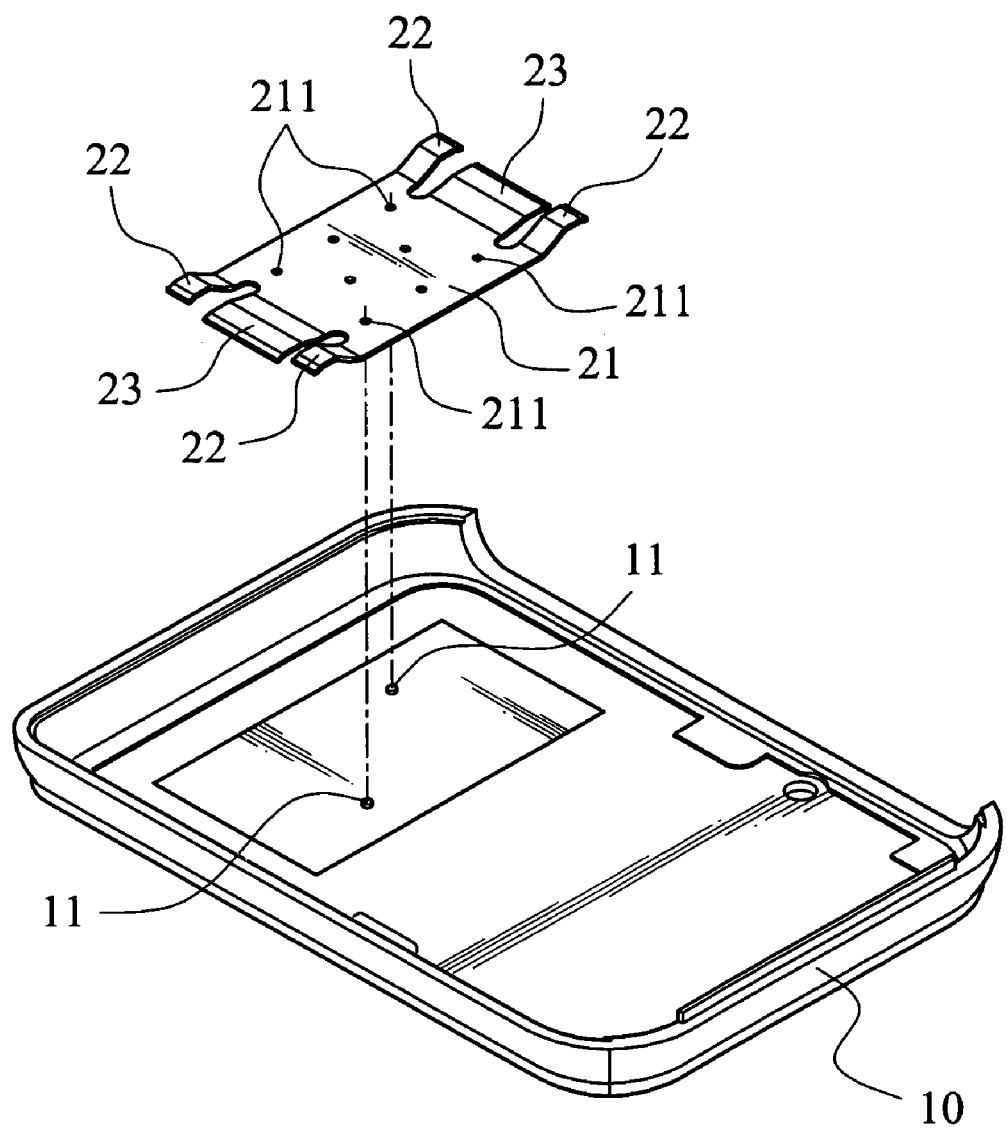
FIGS. 2A and 2B are decomposition and assembly diagrams of an electronic device using the invention.
Figure 2B:
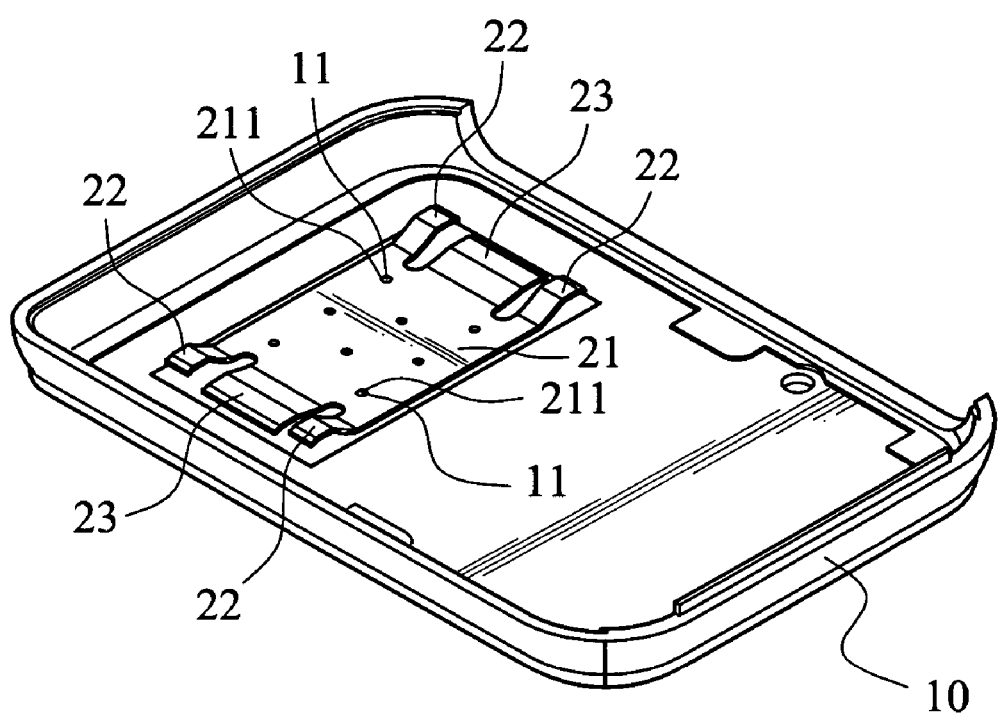

FIGS. 1A and 1B show the front and side views of the invention. FIGS. 2A and 2B are the decomposition and assembly diagrams of an electronic device using the invention. The invention is a pressing device for pressing lithium batteries with different thickness. It is installed in an electronic device 10 and includes a body 1, a first pressing part 22, and a second pressing part 23.

The body 21 has openings 211 corresponding to pins 11 on the electronic device 10 for the installation of the electronic device 10. The number of pins 11 is less than the number of openings 211. The pins 22 are distributed on opposite corners of the openings 211. Therefore, there are two ways to install the body 21 and the electronic device 10.

Figure 3A:
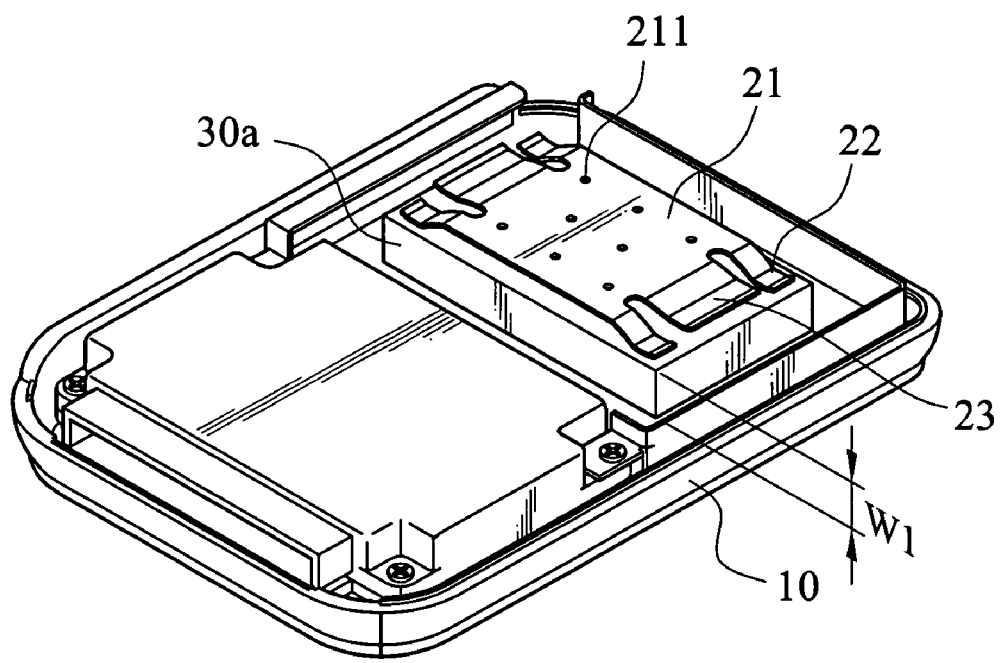
FIGS. 3A and 3B are front and side views of installing a first lithium battery in the electronic device using the invention.
Figure 3B:
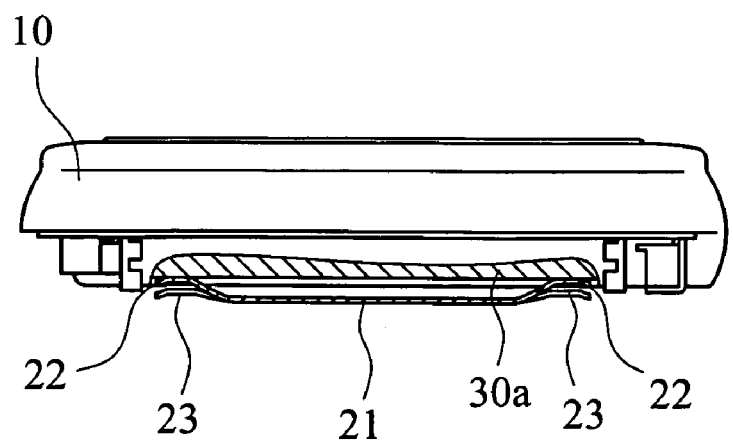

The first pressing part 22 protrudes from the body 21 to press against a first lithium battery 30a with a first thickness W1 (see FIGS. 3A and 3B).

Figure 4A:
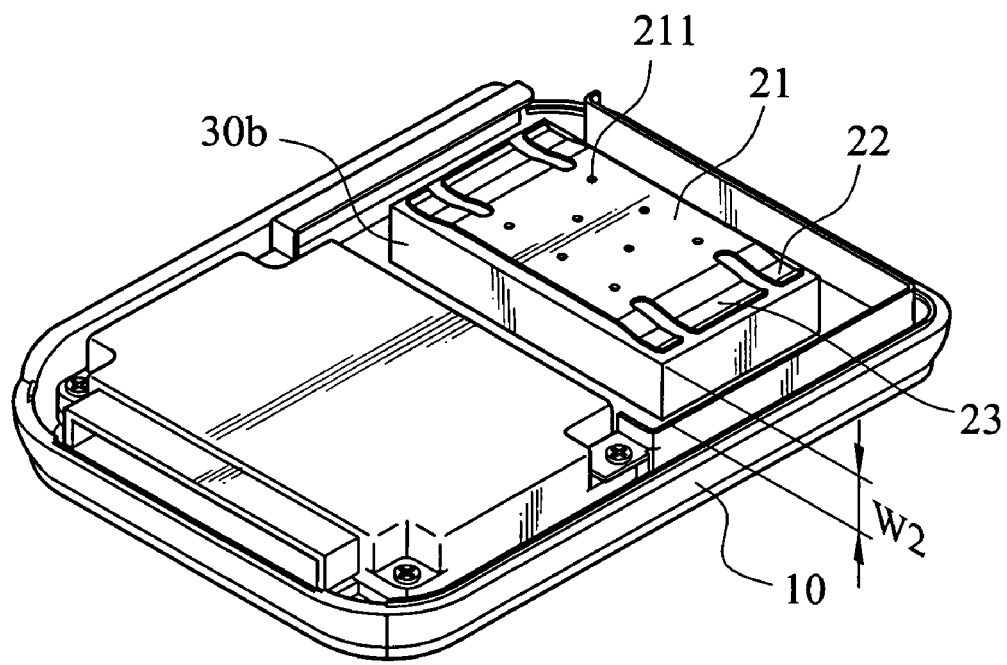
FIGS. 4A and 4B are front and side views of installing a second lithium battery in the electronic device using the invention.
Figure 4B:
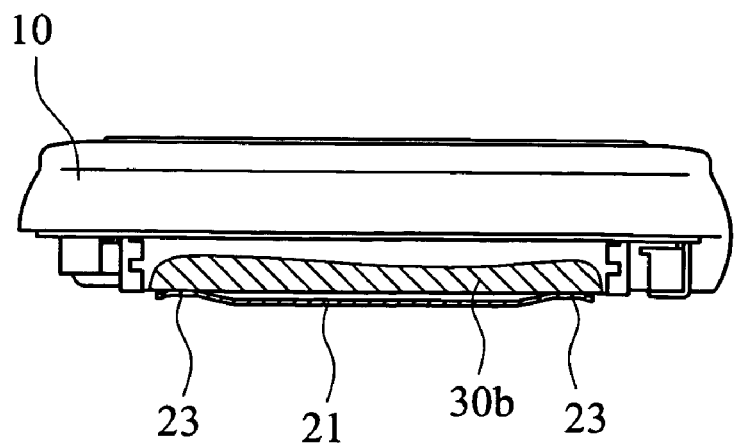

The second pressing part 23 also protrudes from the body 21, with a different curvature from the first pressing part 22, to press against a second lithium battery 30b with a second thickness W2 (see FIGS. 4A and 4B). As shown in the drawing, the curvature of the first pressing part 22 is smaller than that of the second pressing part 23. The first thickness W1 is different from the second thickness W2 (the former is thinner as suggested in FIGS. 3B and 4B). The width of the first pressing part 22 is smaller than that of the second pressing part 23.

When assembling the invention to the electronic device, one first aligns the openings 211 with the pins 11 and then fixes the invention in the electronic device using an adhesive agent.

When in use, the first lithium battery 30a is placed inside the electronic device 10. Since it has the first thickness, it is pressed by the first pressing part 22 (see FIGS. 3A and 3B).

When the second lithium battery 30b is placed inside the electronic device 10, it is pressed by both the first pressing part 22 and the second pressing part 23 because of its thickness W2 (see FIGS. 4A and 4B). Since the curvature of the first pressing part 22 is smaller than that of the second pressing part 23, the first lithium battery 30a with the first thickness W1 is pressed only by the first pressing part 22. The second lithium battery 30b with the second thickness W2 is pressed by both the first pressing part 22 and the second pressing part 23.

Moreover, since the curvature of the first pressing part 22 is smaller than that of the second pressing part 23 and the width of the first pressing part 22 is smaller than that of the second pressing part 23, the pressing force experienced by the second lithium battery 30b from the first pressing part 22 is no bigger than that experienced from the second pressing part 23. The second lithium battery 30b is thus fixed in its position.

In summary, the invention uses the first pressing part 22 and the second pressing part 23 to provide the necessary pressing forces on the first lithium battery 30a and the second lithium battery 30b in the electronic device 10, fixing them in their positions. There is no need for additional tools.

Certain variations would be apparent to those skilled in the art, which variations are considered within the spirit and scope of the claimed invention.

What is claimed is:

1. A pressing device installed in an electronic device for pressing lithium batteries with different thickness, the pressing device comprising:
   a body;
   a first pressing part, which protrudes from the body and presses against a first lithium battery with a first thickness; and
   a second pressing part, which protrudes from the body and presses against a second lithium battery with a second thickness;
   wherein the curvature of the first pressing part is different from that of the second pressing part, and the first thickness is different from the second thickness.

2. The pressing device of claim 1, wherein the body has a plurality of openings corresponding to pins on the electronic device for the installation of the electronic device.

3. The pressing device of claim 1, wherein the width of the first pressing part is smaller than the width of the second pressing part.

* * * * *